United States Patent Office 3,232,238
Patented Feb. 1, 1966

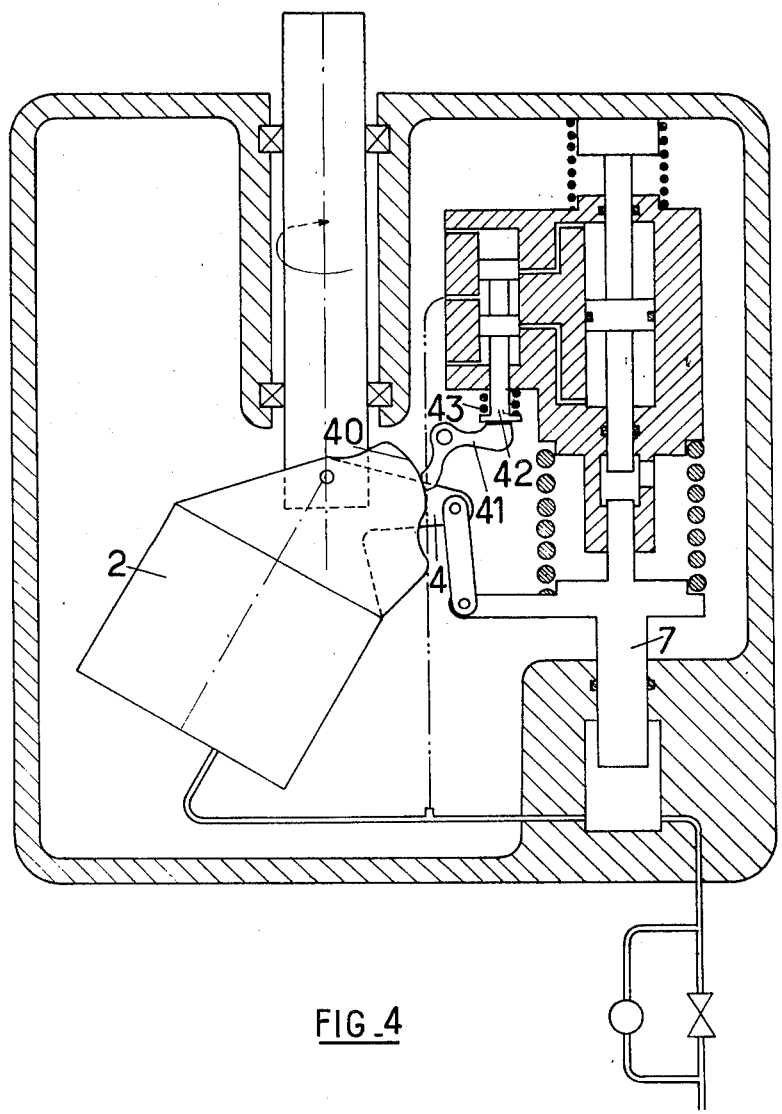
FIG_4

3,232,238
SELF REGULATING VARIABLE FLOW PUMPS
Jacques Faisandier, 32 Blvd. Felix Faure,
Chatillon-sous-Bagneux, France
Filed Sept. 28, 1961, Ser. No. 141,437
Claims priority, application France, Oct. 5, 1960,
840,512
4 Claims. (Cl. 103—162)

The invention relates to variable flow, self-regulating pumps, namely, variable flow pumps whose flow is correlated to the pressure by means which ensure automaticity.

These pumps are well known and the inventor has described a certain number of them in his book "Les Mecanismes Hydrauliques" published by Dunod, Paris, 1957.

Pumps of this type can be classified into two groups. The better known group includes pumps whose flow varies inversely with the pressure. Their disadvantage is that, at high rates of flow, the pressure decreases and the maximum available power is reduced.

With the pumps in the other group, the pressure is independent of the flow and only varies during variations in flow, returning to its initial value as soon at the flow turns to a stable value.

The object of the invention is to solve various problems which cannot be satisfied by the two groups of known pumps. These problems or requirements are as follows:

(a) The requirements of compensating for loss of head in the ducts at high rates of flow.

(b) The requirement of meeting the demands of certain devices, such as centrifugal pumps driven by hydraulic motors which require a higher pressure at high speeds than at low.

(c) The requirement of only subjecting the pump to a lower pressure when the flow is zero for the purpose of prolonging its life.

(d) The requirement of supply certain driven devices which need a high pressure for starting up.

With these objects in view, the invention consists in the use of a variable flow or displacement pump which is self-regulating, and whose pressure varies in positive correlation with the flow.

More particularly and with a view of solving the fourth problem or requirement, the invention comprises the use in combination of a variable flow self-regulating pump device whose pressure varies in positive correlation with the flow with a bypass device allowing for the partial bypassing of the driven device for starting up and thus producing an artificial increase in the flow in relation to the flow of the driven device, and consequently a short-period increase in pressure during starting.

The invention consists more particularly in a specific self-regulating pump whose pressure is a positive gradient function of the flow. The pump comprises a pressure regulator, acting on the device for regulating the flow, which is not constituted by a servo-control with feedback or by an servo-control without feedback, as in known devices, but which is constituted by the combination of a servo-control including a feedback device and of a servo-control without feedback associated to produce a differential effect on the device for regulating the flow.

From another point of view the device according to the invention can be considered as being derived from the classical servo-control including a feedback device for stabilising flow, in which the back pressure acts on the control valve against a spring determining the pressure or self-regulation, with this difference, that the load of the spring is a function of the back pressure and that a differential device is interposed in the feedback movement of the servo-control.

Various examples of embodiments of the invention are now given. However, the applicant does not wish to limit the generic scope of his invention by or to the particular features of the examples shown for illustration.

In the attached drawings:

FIGURE 4 is a diagrammatic view of a device in which the transmission by the lever has been replaced by a cam transmission.

Figure 1:
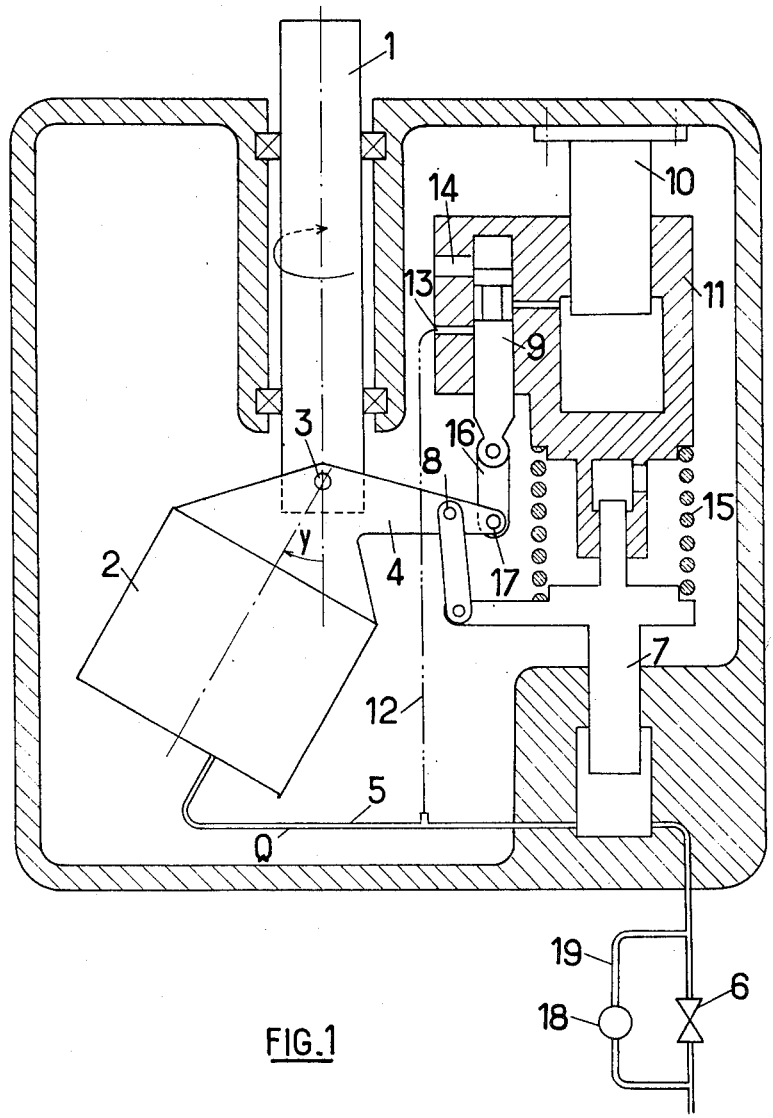
FIGURE 1 is a diagrammatic view of a device according to the invention.

In FIGURE 1 there is schematically represented a pump with variable flow of which only the shaft 1 is shown, the device for regulating the flow being represented by a pump body 2 able to swing about the axis 3 from a datum that may be the axis of shaft 1. The pump body 2 can be perpendicular or parallel to the axis of rotation and the position of the pump body from the datum 10 is indicated by the angle Y. The flow Q of the pump is a positive gradient function of Y.

This diagram is applicable to many different types of pumps with pressure regulators, for instance: Star pumps with a rotary cylinder block, rotary barrel pumps, and others in which in the limit the rotation can be a translatory movement (Olaer pumps). (This list does not pretend to be exhaustive; namely, where the volume of discharge is indicated by the position of an element from a datum.)

The swinging part is controlled by the finger 4 which in this example is a lever. 5 denotes the delivery pipe of the pump, with this pipe or discharge conduit being connected at 6 to a driven device or to the control valve of a driven device, or a simple aperature which can be controlled to define a given flow. A plunger or piston 7 is always exposed to the discharge pressure of the pump and is drivingly connected directly or indirectly with the finger 4 at 8. It will be recognized that this is a classical arrangement for varying the flow in a negative gradient function of the pressure.

The plunger 7 also acts on the slide valve 9 of the servo-control whose plunger 10 is fixed while the body 11 of the jack is movable. This body 11 forms an abutment against which spring 15 presses.

The pressure fluid which drives this servo-control can be abstracted from the pipe 5 through the duct 12 as shown, but it could reach point 13 from an independent hydraulic source. 14 denotes the return duct to the reservoir. It will be seen that the increase of pressure in the delivery pipe tends to move the piston 7 against the action of the spring 15.

It will be recognized that this would be a conventional pressure stabilizing servo-control providing that the spring 15 rests against a fixed point and providing that the outlet or exit movement acts positively on the finger 4.

It is, on the contrary, a characteristic of the invention that the exit movement is transmitted back, on the one hand, the plunger 7 and, on the other hand, to the finger 4, hence to the slide valve 9 through the spring 15.

The movement of the finger 4 is transmitted to the side valve 9 by the transmission link 16 pivotally connected at 17 with the finger 4.

The device works as follows:

Suppose, first of all, that the pivotal points 8 and 17 coincide. It will then be seen that a draught of fluid at 6 tends to move the plunger downwards under the action of the spring 15 owing to the decrease in pressure and to increase therefore the flow. The movement of the slide valve 9, and therefore of the body 11 downwards tends to re-establish exactly the thrust exerted on the plunger 7 by the spring 15. An increase in flow at a constant pressure has therefore been obtained. However, assuming that the pivotal points 8 and 17 are arranged as shown in the figure with $$\overline{3-17} > \overline{3-4}$$

the amplitude of the movement of the body 11 will be greater than the amplitude of the movement of the plunger 7. Consequently, the thrust exerted by the spring 15 on the plunger 7 will be greater than in the initial position. Therefore an increase in flow will have been obtained and also an increase in pressure.

If during starting, the component 6 requires a greater pressure than during normal running, the valve 18 of the bypass 19 will be slightly opened for a moment in order to cause a momentary increase in the flow of the pump, and therefore on the pressure.

It can easily be shown by calculation that by adopting a servo control with valve leakage creating a permanent constant bleed, and having, moreover, a suitably chosen time constant, a stable transfer equation is obtained.

Figure 2:
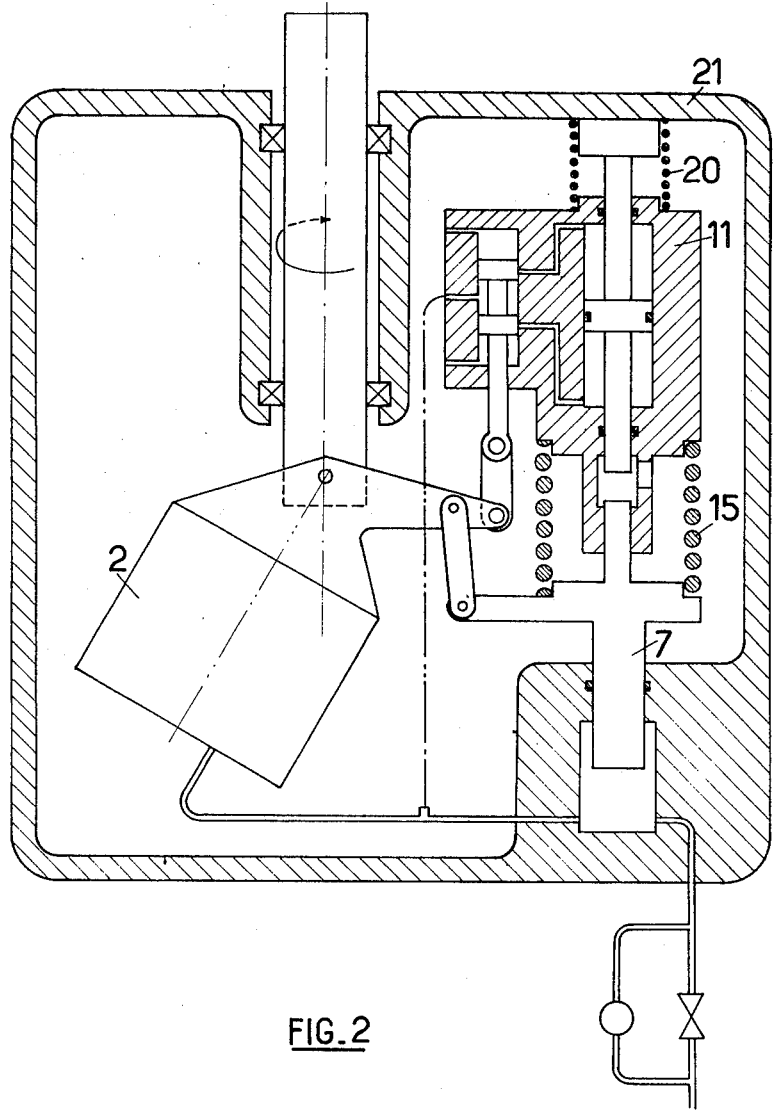
FIGURES 2 and 3 are diagrammatic views of two different embodiments of the invention, respectively.

The embodiment shown in FIGURE 2 differs from the embodiment shown in FIGURE 1 by the arrangement of the spring 20 placed between the body 11 and a fixed support, in this case the casing 21. This spring which helps the servo-control enables a servo-control to be made which is smaller, better balanced and capable of facilitating the provision of a permanent constant bleed to the control valve so as to favor stability.

Figure 3:
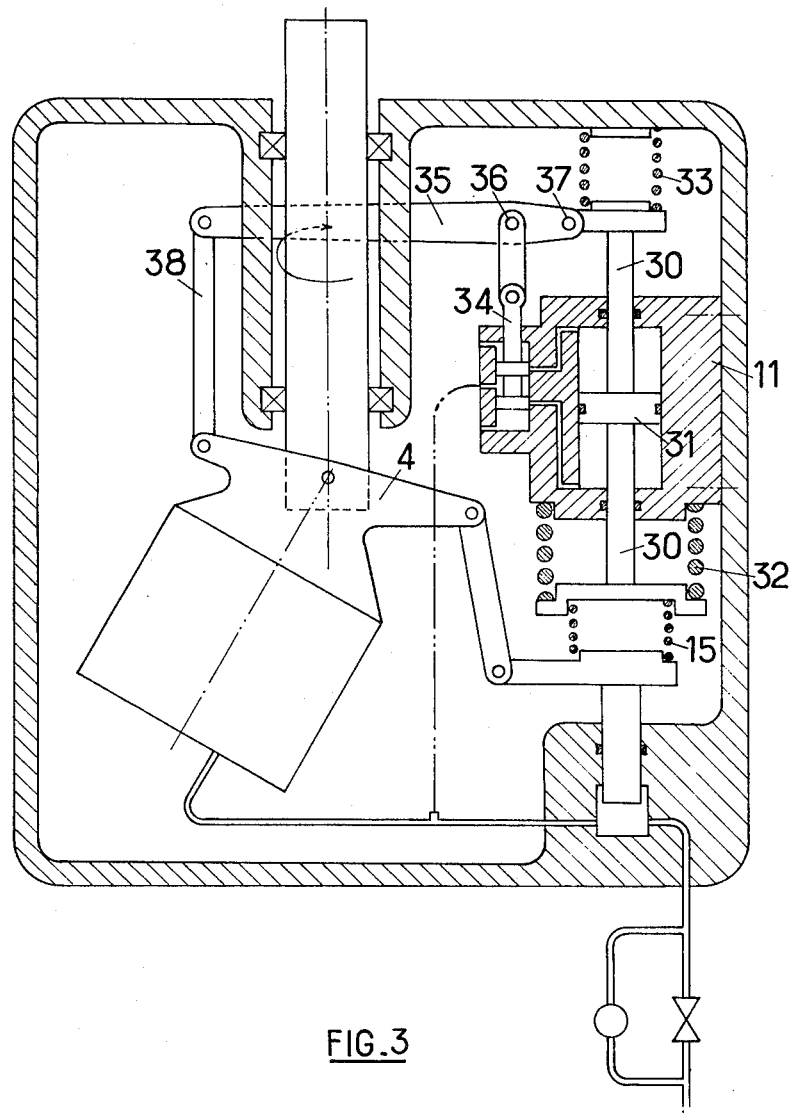

In the embodiment shown in FIGURE 3, the body 11 of the servo-control is fixed while the outlet movement is provided by the rod 30 of the piston 31.

As shown in FIGURE 2 it would be possible to use a spring supplementing the spring 15, but in this case the supplementary spring has been replaced by two springs 32 and 33.

In this figure the feed back of the movement of the swinging part 4 to the slide valve 34 and to the rod of the piston 30 is caused by the pitman 34 and the differential lever 35. The pivotal connections denoted by 36 and 37 correspond to the pivotal connections 17 and 8, respectively, of FIGURE 1.

In the FIGURES 2 and 3, the control valve is of the five-way, two-sequence classic type with a closed centre whose method of operation is well known.

FIGURE 4 is a variant of the embodiment shown in FIGURE 2. In this variant the transmissions between the swinging part 2 and the plunger 7 is assured by a lever 4 and by a positive transmission, while the transmission between the part 2 and the control valve is assured by a cam 40 and a follower 41 which acts on the rod 42 of the slide valve of the control valve. The follower is held against the cam by the spring 43.

The method of operation is the same as in the preceding embodiments with the difference that the cam replacing the levers provides for a pressure curve which need not be a linear function of the flow.

What I claim is:

1. In combination, a variable displacement pumps in which the displacement of the pump is a function of the position of a pump element with respect to a datum:
   a discharge conduit from said pump body to lead liquid to a point of use of the liquid;
   a movable abutment;
   a pressure sensing means resiliently supported by said movable abutment to sense changes of pressure within said discharge conduit;
   first control means operatively connecting said pressure sensing means to said pump element to move said pump element relative to said datum to reduce the displacement of said pump upon an increase of pressure and to move said pump element to increase the displacement of said pump upon a decrease of pressure;
   second control means operatively connected to said pump element to be moved by movement of said pump element a distance expressing a function of the pump displacement; and
   hydraulic means actuated by fluid under pressure to position said abutment with respect to said pressure sensing means.

2. The device of claim 1 in which said hydraulic means includes a valve mounted in said abutment, said second control means includes a differential lever, an end secured to said abutment means, the other end moved by said pump element and having an operative connection to said valve, whereby the valve is positioned to actuate said hydraulic means.

3. The combination as set forth in claim 3, in which said second controller includes a hydraulic amplifier by which said second regulating means and said second measuring member of said second controller are operatively connected.

4. In combination, a variable displacement liquid pump of the type in which the displacement of the pump is a function of the position of a pump element with respect to a datum;
   a discharge conduit from said pump element to lead liquid to a point of use of the liquid;
   a movable abutment;
   piston means resiliently supported by said movable abutment and exposed at all times to the pressure of, and to changes of pressure within, said discharge conduit;
   first control means operatively connecting said piston means to said pump element to move said pump element relative to said datum to reduce the displacement of said pump upon an increase of pressure, and to move said pump element to increase the displacement of said pump upon a decrease of pressure;
   second control means operatively connected to said pump element to be moved by movement of said pump element a distance expressing a function of the pump displacement, and
   means actuated by said second control means to position said abutment with respect to said pressure sensing means.

References Cited by the Examiner

UNITED STATES PATENTS

| 2,283,321 | 5/1942 | Doe et al. | 103—1 |
| 2,411,574 | 11/1946 | Hunt | 103—42 |
| 2,562,615 | 7/1951 | Huber. | |
| 2,889,780 | 6/1959 | Binford | 103—16 |
| 2,944,488 | 7/1960 | Meyer | 103—35 |
| 2,971,498 | 2/1961 | Bloch | 103—1 |
| 2,982,216 | 5/1961 | Huber | 103—21 |
| 3,016,018 | 1/1962 | Williams | 103—37 |
| 3,020,847 | 2/1962 | Rohrberg | 103—37 |
| 3,067,693 | 12/1962 | Lambeck | 103—38 |

LAURENCE V. EFNER, *Primary Examiner.*